United States Patent

Myöhänen et al.

[11] Patent Number: 5,634,516
[45] Date of Patent: Jun. 3, 1997

[54] METHOD AND APPARATUS FOR TREATING OR UTILIZING A HOT GAS FLOW

[75] Inventors: Kari Myöhänen, Karhula; Kim Westerlund, Helsingfors; Kurt Westerlund, Helsinki, all of Finland

[73] Assignee: Foster Wheeler Energia Oy, Helsinki, Finland

[21] Appl. No.: 569,858

[22] Filed: Dec. 8, 1995

Related U.S. Application Data

[63] Continuation of Ser. No. 264,047, Jun. 22, 1994, abandoned.

[30] Foreign Application Priority Data

| Jun. 23, 1993 | [FI] | Finland | 932923 |
| Mar. 31, 1994 | [FI] | Finland | 941543 |

[51] Int. Cl.⁶ ........................................ F28D 13/00
[52] U.S. Cl. ........................... 165/104.16; 122/40
[58] Field of Search .................... 165/104.16; 122/40

[56] References Cited

U.S. PATENT DOCUMENTS

| 4,119,395 | 10/1978 | Hatanaka et al. | 431/11 |
| 4,594,967 | 6/1986 | Wolowodiuk | 165/104.16 X |
| 4,690,802 | 9/1987 | Jenkinson | 165/104.16 X |
| 4,709,663 | 12/1987 | Larson et al. | 165/104.16 X |
| 4,770,237 | 9/1988 | Morin et al. | 165/104.16 |
| 4,896,717 | 1/1990 | Campbell, Jr. et al. | 165/104.18 |
| 5,014,652 | 5/1991 | Hyldgaard | 165/104.16 X |
| 5,025,755 | 6/1991 | Eickvonder et al. | 165/104.16 X |
| 5,064,621 | 11/1991 | Uyama et al. | 422/147 X |
| 5,140,950 | 8/1992 | Abdulally | 165/104.16 X |
| 5,205,350 | 4/1993 | Hirsch et al. | 165/104.18 |
| 5,226,475 | 7/1993 | Ruottu | 165/104.18 |
| 5,242,012 | 9/1993 | Lai et al. | 165/104.16 |
| 5,281,398 | 1/1994 | Hyppanen et al. | 422/147 |
| 5,308,585 | 5/1994 | Ströder et al. | 165/104.16 X |
| 5,341,766 | 8/1994 | Hyppanen | 165/104.16 X |
| 5,365,889 | 11/1994 | Tang | 165/104.16 X |

FOREIGN PATENT DOCUMENTS

| 2086674 | 1/1992 | Canada. |
| 64997 | 8/1986 | Finland. |
| 2140144 | 11/1984 | United Kingdom. |
| WO94/11691 | 5/1994 | WIPO. |

*Primary Examiner*—John Rivell
*Assistant Examiner*—Christopher Atkinson
*Attorney, Agent, or Firm*—Nixon & Vanderhye P.C.

[57] ABSTRACT

A method and apparatus for cooling hot gas in a reactor which is provided with a mixing chamber for hot gas and a chamber encompassing a bubbling fluidized bed in the lower section of the reactor, a riser in the middle section, a gas outlet in the upper section of the reactor, and heat transfer surfaces for recovering heat from solid particles. The hot gas is introduced through the mixing chamber into the lower section of the reactor. In the mixing chamber solid particles are supplied to the hot gas for cooling the gas. The gas containing solid particles is conveyed into a separator. From the separator, the gas is conveyed through the riser into particle separators and, when purified, out of the reactor. The solid particles separated in the particle separator are returned to the lower section of the reactor, preferably both directly into the mixing chamber and into the fluidized bed. From the fluidized bed, cooled solid particles are conveyed to the mixing chamber for cooling of hot gas.

29 Claims, 2 Drawing Sheets

METHOD AND APPARATUS FOR TREATING OR UTILIZING A HOT GAS FLOW

This is a continuation of application Ser. No. 08/264,047, filed Jun. 22, 1994, now abandoned.

BACKGROUND AND SUMMARY OF THE INVENTION

The present invention relates to a method and apparatus for cooling or utilizing hot gas in a reactor in which the lower section of the reactor is provided with a hot gas inlet and a chamber encompassing a fluidized bed, the middle section is provided with a riser, and the upper section with a gas outlet, and the reactor has heat transfer surfaces for recovering heat from solid particles. The invention especially relates to a method, in which hot gas is introduced through the inlet into the lower section of the reactor, and solid particles from the bubbling fluidized bed are fed to the inlet gas for cooling thereof, solid particles are separated from the cooled gas and returned to the fluidized bed, heat is recovered from the separated solid particles, and the cooled gas is discharged through the gas outlet.

Fluid bed reactors are well suited to cooling of hot gases containing molten and/or vaporized components and/or tar-like particles. Gas coolers are suited to, e.g., cooling of exhaust gases from industrial plants and dry purification of gases from partial oxidation of biomass, peat or coal containing dust and tar and other condensing components. The hot gases introduced into the reactor are efficiently cooled by mixing solid particles therewith, such solid particles having been cooled earlier in the reactor.

Finnish patent 64997 teaches cooling of hot gases in circulating fluidized bed reactors. Here hot gases are fed as fluidizing gas into the mixing chamber of the reactor, where the gases cool efficiently as they come into contact with a large volume of solid particles, i.e., bed material. Solid particles are carried by the gas flow through the riser into the upper section of the reactor, where they are separated and then returned to the fluidized bed in the mixing chamber. In the riser, the gas flow conveying solid particles may be cooled by heat transfer surfaces.

A drawback of the method described above is, however, that the hot gases to be cooled have to fluidize a large volume of solid particles, resulting in a high power requirement. On the other hand, a sudden interruption in the power supply may result in the entire bed flowing through the inlet and then out of the reactor.

Finnish patent application 913416 also teaches cooling of hot process gas during stationary fluidization, i.e., a bubbling fluidized bed. here the hot gas flowing into the reactor is supplied with solid particles as an overflow from the bubbling fluidized bed. The gas and the solid particles entrained therewith flow into a dust collector disposed above the bubbling fluidized bed, from which solid particles then drop back onto the surface of the bubbling fluidized bed as the flow rate of the gas quickly decreases. The bubbling fluidized bed and the gas riser, which is disposed above the dust collector, are provided with heat transfer surfaces.

In the arrangement described above, the particles falling onto the surface of the bubbling fluidized bed are carried along the surface back to the overflow point, where they are immediately taken to recirculation, ending up in the dust collector. Thus, a separate "surface circulation" of hot particles develops above the fluidized bed. These particles do not cool efficiently in the fluidized bed because the particles which are deeper down in the fluidized bed, near the heat transfer surfaces, cannot mix efficiently with the particles present in the "surface circulation".

In the method described above, the riser is considered a natural place for the heat transfer surfaces because the solids and gas flows are swift in the riser. The gas stream, however, causes wear of the heat transfer surfaces in the riser. Wear is partly attributable to the composition of the gas as well as to the dust contained in it, and partly to the high flow rate of the gas.

In some cases, the hot gas flowing to the separator may cause fouling and clogging of the heat transfer surfaces when the gas enters the heat transfer surfaces at too high a temperature. If the hot gas does not cool until it touches the heat transfer surfaces, the impurities will correspondingly condense on or adhere to these surfaces, and not on the circulating mass particles as intended.

Chlorine-containing gases, in particular, cause corrosion at high temperatures and, therefore, superheating of steam to high temperatures is not usually possible in the heat transfer surfaces of the riser. $SO_3$ may cause problems with the heat transfer surfaces at low temperatures.

According to the present invention an improved method and apparatus, when compared with the above-described methods and apparatus, for cooling or utilizing hot gases in the hot gas treatment of solid material are provided. The method and apparatus of the invention are provided to minimize power consumption and wear of the heat transfer surfaces.

The method and apparatus provide means by which the heat energy released by the hot gas when it cools may be utilized as efficiently as possible, e.g., for generation of superheated steam, without a substantial risk of corrosion.

The invention provides a method and apparatus for substantially decreasing the corrosion of the heat transfer surfaces caused by components, such as chlorine, contained in the gas, and thus utilizes more efficiently the heat energy released by the hot gas when it cools. [For example, for the generation of superheated steam.] The invention also provides fast and effective cooling of the gases.

According to one aspect of the present invention, there is provided a method of cooling hot gas (e.g. typically at a temperature greater than 400 degrees C to about 200–400 degrees C, or below) from about 1000–1300 degrees C in a reactor having lower and upper sections, and having an inlet duct and a mixing chamber centrally located in the lower section and a fluidized bed in the lower section of the reactor radially outward from the inlet duct and mixing chamber, a riser from the mixing chamber, and a gas outlet in an upper section of the reactor and a particle separator in communication with the upper section of the reactor. The method comprising the following steps: (a) Introducing hot gas into the mixing chamber through the inlet duct, the gas flowing upwardly through the mixing chamber where it comes into contact with and entrains cooling particles, and then flows into the riser. (b) Separating particles from gas in the separator and returning the separated particles toward the fluidized bed. (c) Introducing some returning particles from step (b) directly into the mixing chamber and others into the fluidized bed. (d) Cooling the particles in, or prior to return to, or both in and prior to return to, the fluidized bed; and (e) introducing some cooled particles from the fluidized bed into the mixing chamber so as to contact and mix with the hot gas introduced in step (a) and effect cooling thereof. The method typically also comprises the further step of cooling the particles during the practice of step (b) as the particles are being returned so that the particles introduced by step (c)

directly into the mixing chamber have been cooled. Cooling is practiced to cool the tar and like components of the hot gas so that they are below the temperature at which they are tacky and impede flow (by sticking onto surfaces of the reactor components, etc.), e.g. below 400 degrees C.

According to another aspect of the invention there is provided an apparatus for cooling hot gas is provided comprising the following components: A reactor having a lower section and an upper section. A gas outlet in the upper section. A gas inlet duct located centrally in the lower section of the reactor. A mixing chamber, in which hot gas and cooling particles are mixed, in the lower section of the reactor above the inlet duct, the mixing chamber substantially concentric with the gas inlet duct. A riser connecting the mixing chamber and the upper section of the reactor. A particle separator in operative communication with the upper section of the reactor for separating particles from gas. A return duct for returning particles from the particle separator toward the lower section of the reactor. A fluidized bed of particles connected to the return duct. Means for introducing particles from the return duct directly into the mixing chamber, and into the fluidized bed. Means for cooling separated particles in, or prior to return to, or both in and prior to return to, the fluidized bed and means for introducing some cooled particles from the fluidized bed into the mixing chamber so as to contact and mix with the hot gas introduced into the inlet duct and effect cooling thereof. The introducing means for introducing particles from the fluidized bed into the mixing chamber may comprise a loop seal, J seal, gill seal, valve, baffle assembly, conduit, diverter, or the like which prevent reverse flow to the fluidized bed. The means for introducing particles from the return duct directly into the mixing chamber and into the fluidized bed may comprise a baffle assembly, differently directed conduits, diverter, or the like.

According to a preferred embodiment of the invention, solid particles are preferably conveyed from the fluidized bed through the solids openings provided in the lower section thereof into the hot gas flow in the mixing chamber, in the wall between the mixing chamber and the fluidized bed. Due to a higher static pressure in the fluidized bed, solid material may be caused to flow automatically through the openings into the hot mixing chamber, but the solids flow may also be regulated by feeding fluidizing gas into the openings, which prevents flowing of the gas from the mixing chamber to the fluidized bed against the flow direction of the solids. In this way, it is possible to regulate the flow of solid particles.

In the reactor according to the invention, hot gas is cooled to a substantially lower temperature immediately at the mixing chamber by mixing cooled solid particles with the gas, so that the gas cools and the solid particles are correspondingly heated. Besides cooling of gases, the invention may be employed in processes where solid material is heated or otherwise treated with hot gases, such as, e.g., heating of lime with hot gases.

In a reactor according to a preferred embodiment of the invention, gas may also be cooled by constructing the mixing chamber and the riser of cooled surfaces. Solid particles are separated from the gas in a particle separator. The solid particles are conveyed as a dense suspension, almost as a plug flow if desired, via the return duct back to the lower section of the reactor. In the return duct there preferably is disposed heat recovery surfaces for recovering the heat energy released by heated solid particles, and they may be connected to other heat exchangers, a turbine, or the like. According to the invention, solid particles are returned to the mixing chamber in the lower section of the reactor, into the gas to be cooled. The return duct is preferably provided with means for leading the returning solid particles directly to the mixing chamber, and to the fluidized bed.

Proper control of the circulating solids flow improves the controllability and increases the reaction velocity of the process. Furthermore, the circulating fluidized bed maintains the reactor surfaces clean, ensuring that clogging does not occur, so that cooling of the gas is always certain when the cooling of the solids functions reliably.

The return duct is a favorable location for heat transfer surfaces because the particle density is relatively high there, which is beneficial for heat transfer. Hot gas containing molten or condensing components, which might clog the heat transfer surfaces, also does not significantly flow into the return duct.

Heat transfer surfaces may also be disposed in the fluidized bed itself, where the flow is slow and thereby favorable to the durability of the heat transfer surfaces. Also such gas that provides favorable conditions, e.g., inert gas, air or other gas containing non-corroding substance, may be supplied to the fluidized bed as a fluidizing gas. Also heat exchange is efficient due to a high particle density.

The method and apparatus according to the invention provide efficient mixing of solids and hot gas and, consequently, efficient heat exchange from the gases to the solid material. Furthermore, the method and apparatus according to the invention provide a simple arrangement for minimizing wear of the heat transfer surfaces in the gas cooler. At the same time, power consumption is capable of being lowered in comparison with the prior art. Furthermore, in the arrangement according to the invention, the heat energy released by the gases is well utilized, e.g., by generating superheated steam.

DETAILED DESCRIPTION OF THE DRAWINGS

Figure 1:
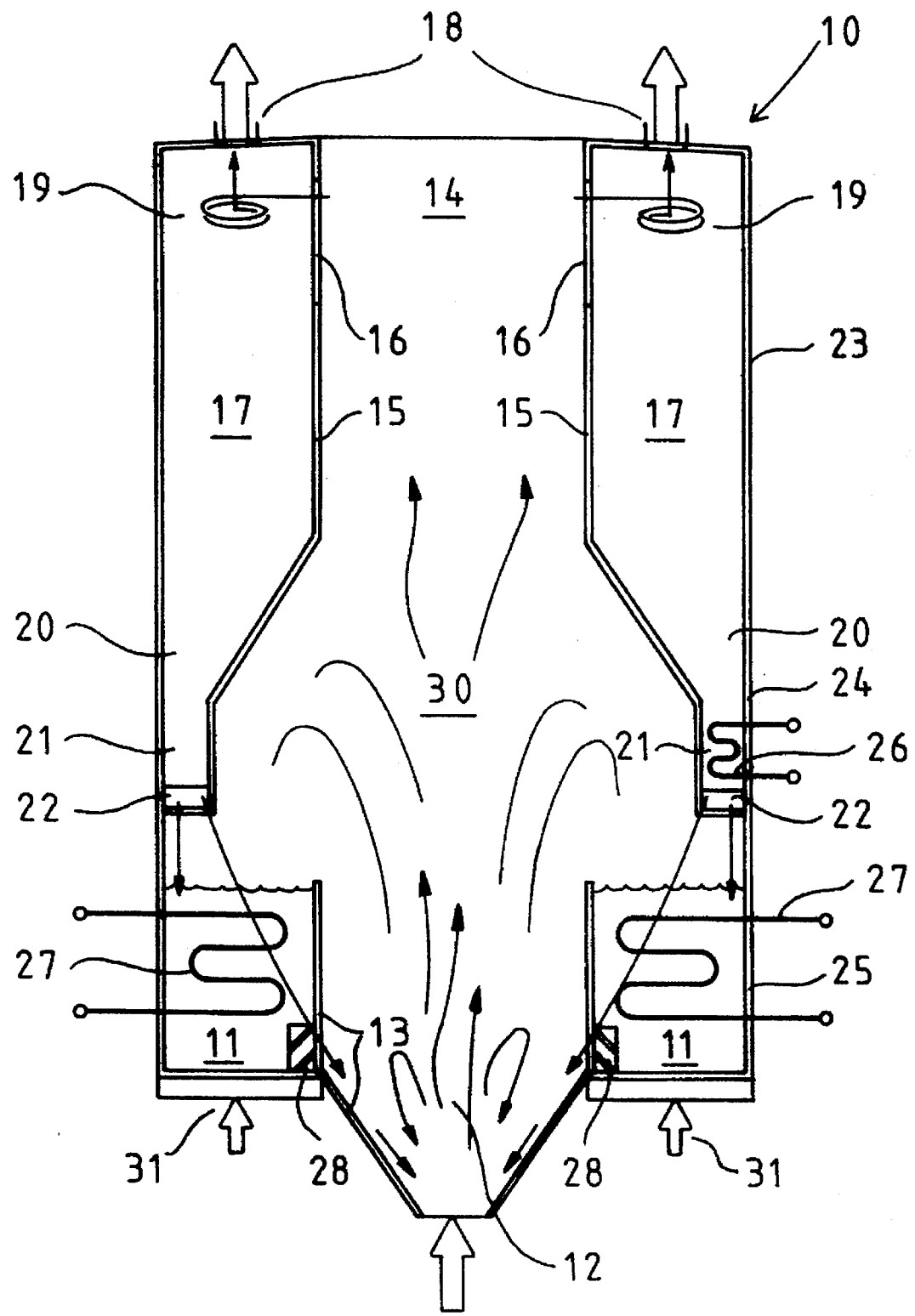
FIG. 1 is a schematic illustration of a first embodiment of a reactor according to the present invention.

FIG. 1 illustrates a reactor 10 for cooling or utilizing hot process gases. The reactor 10 comprises a chamber in the lower section thereof. The chamber has an open top and is provided with a bubbling fluidized bed 11. Inside the chamber is provided a mixing chamber 12 which has an open top and which is substantially defined by walls 13 separating the mixing chamber 12 from the fluidized bed 11. The mixing chamber 12 has an upwardly widening lower section into which hot gases are fed. The walls 13 of the mixing chamber may be constructed of cooling panels for recovering heat. The fluidized bed reactor 10 may be either annular or rectangular in shape. In the former case the fluidized bed preferably encircles the mixing chamber 12 and in the latter case the fluidized bed 11 is disposed adjacent to at least one wall 13 of the rectangular cross-section mixing chamber. In the embodiment of FIG. 1, the mixing chamber 12 is surrounded by the fluidized bed 11. The mixing chamber 12 may have the configuration of a truncated cone or prism.

On top of the mixing chamber 12 and partly on top of the fluidized bed 11 is disposed a preseparation chamber 30. The cross section of the bottom of the preseparation chamber 30 is larger than the cross section of the mixing chamber 12. Above the preseparation chamber 30 is disposed a riser 14 which is preferably defined by cooling panels 15. The upper part of the rise 14 is provided with openings 16, which bring the riser into communication with one or more particle separators 17, which are structurally integrated with the riser 14.

The particle separators 17 are mounted adjacent to the upper part of the riser 14, the walls 15 of the riser 14 preferably forming part of the wall surface of the particle separators 17. The particle separators 17 are preferably cyclone separators, in which gas outlets 18 and inlet opening 16 provide a vortex flow 19 per each outlet. The lower section 20 of each particle separator 17 is in communication with a return duct 21, which includes means 22 for distributing the flow of solid particles into partial flows. That is means 22 provides for solid particles to be returned directly to the mixing chamber 12, and also to the fluidized bed 11. The return duct 21 preferably forms a slot-shaped duct in connection with the lower section of the riser 14, and the wall 15 of the preseparation chamber 30 or riser 14 preferably constitutes a wall of the return duct 21. The outer wall 23 of the particle separator 17, outer wall 24 of the return duct 21 and outer wall 25 of the fluidized bed 11 may all be of one and the same construction, e.g. membrane panels.

The means 22 may comprise a baffle assembly, differently directed conduits, a diverter, fluidized compartments, or the like.

The return duct 21 is preferably provided with heat transfer surfaces 26. Also the fluidized bed 11 is preferably provided with heat transfer surfaces 27.

The reactor 10 functions so that hot gas (e.g. over 400° C. typically 1000°–1300° C.) is introduced into the lower sections of the reactor or through an inlet duct at the bottom of the mixing chamber 12, which hot gas is mixed with cooled solid particles in the fluidized bed 11 adjacent the mixing chamber 12. The hot gas cools very quickly by releasing heat energy to solid particles and, in a short time, it reaches such a temperature level (e.g. about 200° C.–400° C.) at which components thereof, such as tars, are no longer sticky, and thus do not impede the progress of the gas.

The gas and solid particles entrained therewith flow as a suspension upwardly into the preseparation chamber 30. The cross section of the preseparation chamber 30 is larger than that of the mixing chamber 12. Hence, a portion of the particles flowing upwardly entrained with the gases lose their speed and start to flow by gravity into the fluidized bed 11. The gas suspension flows through the riser 14 and further from its upper part via opening 16 into the particle separators 17, where solid particles are separated from the gas. Purified and cooled gases are led out of the reactor 10 through the outlet 18. According to need, there may be one or more particle separators 17.

The separated solid particles are allowed to flow by gravity downwardly in the return duct 21. Solid particles cool when releasing part of their heat energy in the heat exchanger 26 or to the heat exchangers (not shown) disposed in the walls of the reactor construction. In the embodiment of FIG. 1, cooled solid particles are turned directly to the mixing chamber 12, but a portion of the solid particles may be conveyed from the particle separator 17 through the return duct 21 into the fluidized bed 11.

Appropriate heat transfer fluidizing action is maintained in the fluidized bed 11 by leading fluidizing air or fluidizing gas through nozzles or distributor plates 31 into the fluidized bed 11. Favorable conditions for the heat transfer surfaces may be provided in the fluidized bed 11, e.g., by choosing a suitable fluidizing gas for eliminating, e.g., corroding conditions from the fluidized bed 11. The fluidizing gas may be, e.g., inert gas, purified process gas, or air. The amount of solid particles in the reactor 10, may be adjusted by adding or removing particles according to need. From the lower section of the fluidizing bed 11, solid particles are conveyed through means 28 disposed in the wall 13 into the mixing chamber 12. The carrying force is the pressure difference prevailing between the fluidized bed 11 and the mixing chamber 12. The motion of the solid particles may be adjusted by feeding gas to means 28 or by fluidizing the bed, thereby intensifying the motion of the solid particles. The particles flowing into the mixing chamber are immediately mixed with the fluidized bed in the mixing chamber and also with the hot gas, and a portion of the particles is carried with the hot gas up into the riser 14. In the mixing chamber 12 there also is provided a fluidized bed, which comprises a substantially vertical flow of the suspension of gas and particles, produced above the gas inlet (unnumbered) at the bottom of chamber 12, and a particle flow moving along the walls 13 of the mixing chamber parallel therewith and towards the gas inlet.

The means 28 may comprise a loop seal, J seal, or gill seal with or without transporting gas flow, a valve, baffle assembly, conduit, or diverter.

The embodiment of FIG. 1 in which the reactor 10 and the essential parts thereof are either annular or round in cross-sectional area, allows an implementation in which the reactor structure is square or rectangular. In that case, the cross section of the mixing chamber 12 of hot gases has the shape of an elongated slot. Correspondingly, the cross section of the riser 14 has the shape of a rectangle, and the fluidized bed 11 is provided in two chambers which are of the same length as the substantially rectangular mixing chamber 12 and which are disposed on both sides thereof. In this embodiment, the particle separators 17 are also rectangular in cross section, and they are parallel to the riser 14 and provided on both sides thereof.

Figure 2:
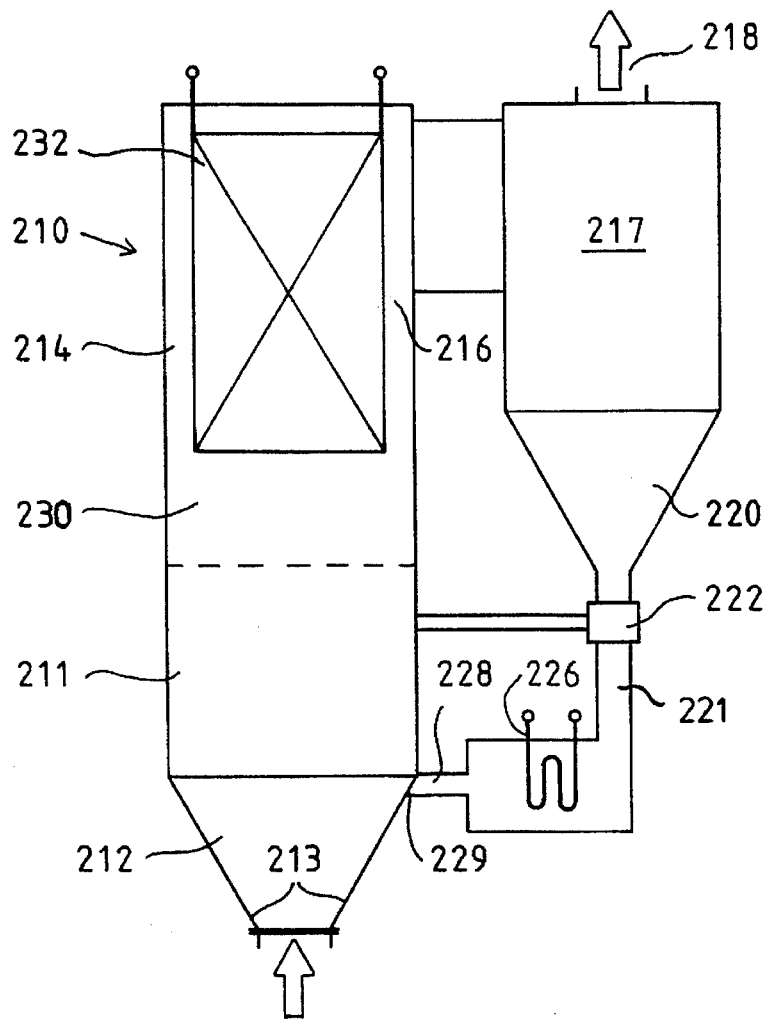
FIG. 2 is a schematic illustration of a second reactor embodiment.
Figure 3:
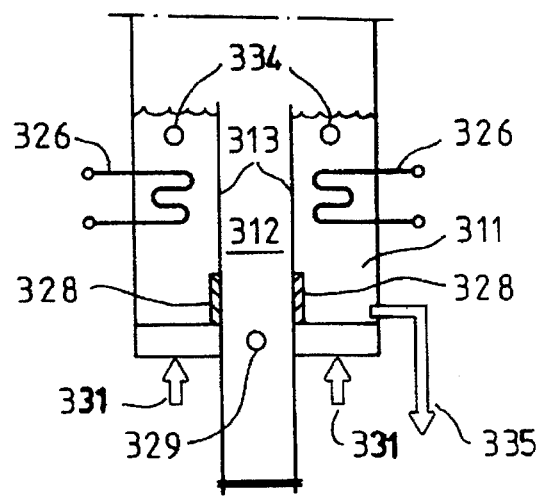
FIG. 3 is a schematic side view of a preferred configuration of the reactor of FIG. 2.

FIGS. 2 and 3 illustrate a reactor 210 for cooling or utilizing hot process gases. The reactor 210 comprises a chamber in the lower section thereof. The chamber has an open top and is provided with a bubbling fluidized bed 211, 311, as in the side view of FIG. 3.

In FIG. 2 the location of bed 211 relative to mixing chamber 212 cannot be seen, but the bed 211 is on both sides of, or surrounds, the chamber 212.

Inside the lower reactor chamber is provided a mixing chamber 212, 312 which has an open top and which is substantially defined by walls 213, 313 separating the mixing chamber 212, 312 from the chamber 211, 311. The mixing chamber 212, 312 has an upwardly widening lower section into which hot gases are fed. The walls 213, 313 of the mixing chamber may be constructed of cooling panels for recovering heat. The fluidized bed reactor 210 is angular in shape, and the fluidized bed 211, 311 is preferably disposed adjacent to at least one wall 313 of the rectangular cross section mixing chamber 212, 312.

The upper section of the riser 214 is provided with an opening 216, which brings the riser into communication with the particle separator 217 structurally integrated with the riser. The particle separator 217 is adjacent to the upper part of the riser 214, and exterior of the reactor 210. The lower section 220 of the particle separator 217 is in communication with a return duct 221, which according to FIG. 2 includes means 222 (e.g. a valve, etc., like means 22) for distributing the flow of solid particles into partial flows. Solid particles are returned to the mixing chamber 212. The return duct 221 preferably also connects the particle separator with the fluidized bed 211.

The return duct 221 is preferably provided with heat transfer surfaces 226. Also the fluidized bed 211, 311 is preferably provided with heat transfer surfaces 326. In accordance with the invention, the gas mixing chamber 212, 312 may be rectangular in cross section, in which mixing chamber at least two opposite walls are outward inclined when seen from bottom to top, so that the bubbling fluidized bed is disposed in an elongated chamber, which has an open top and which is disposed adjacent to the mixing chamber. The mixing chamber 212, 312 may be defined by substantially four walls so that the substantially vertical walls of the mixing chamber are provided with an inlet/inlets for solid material. The bubbling fluidized bed is preferably provided with means 228 (like the means 28) for conveying solid particles from the bed via inlet openings into the mixing chamber.

The reactor 210 shown in FIGS. 2 and 3 functions in the same way as the reactor shown in FIG. 1. Hot gas is introduced into the lower section of the reactor 210, which hot gas is mixed with cooled solid particles in the mixing chamber 212, 312. The hot gas cools very quickly by releasing heat energy to solid particles and, in a short time, it reaches a temperature level at which the components, such as tars, impeding the progress of the process no longer affect the course of process.

The gas and solid particles entrained therewith flow as a suspension upwardly into the preseparation section 230. The cross section of the preseparation section 230 is larger than that of the mixing chamber 212. Hence, a portion of the particles flowing upwardly entrained with the gases loses its speed and starts to flow by gravity into the fluidized bed 211, 311. The gas suspension flows through the riser 214 and further from its upper part via opening 216 into the particle separator 217, where solid particles are separated from the gas. Purified and cooled gases are led out of the reactor through the outlet 218.

The separated solid particles are allowed to flow by gravity downwardly in the return duct 221. Solid particles cool when releasing part of their energy in the heat exchanger 226 or to the heat exchangers (not shown) disposed in the walls of the reactor construction. In the arrangement of FIGS. 2 and 3, cooled solid particles are turned directly to the mixing chamber 212 riser means 214, but a portion of the solid particles may be conveyed from the particle separator 217 through the return duct 221, guided by means 22, also into the fluidized bed 211, 311. Solid material is introduced into the fluidized bed from the return duct 221 via opening 334 and into the mixing chamber via opening 229, 329, which openings are here, for the sake of simplicity, shown as round.

Appropriate fluidization for heat transfer is maintained in the fluidized bed 311 by leading fluidizing air or fluidizing gas through means 331 into the fluidized bed 311. From the lower portion of the fluidized bed 311, solid particles are conveyed through means 328, disposed in the wall 313, into the mixing chamber 312. A portion of the solid particles may be taken out of the process as indicated at 335 in FIG. 3. Then, a new material is brought to the process, e.g., into the return duct (not shown in FIG. 3). The carrying force in leading the solid particles into the mixing chamber 312 is preferably the pressure difference prevailing between the fluidized bed 211, 311 and the mixing chamber 212, 312.

Means 328 (like means 28) preferably serve as the adjusting means of the solids flow and as a loop seal, preventing the gas flow from the mixing chamber into the fluidized bed. Particles flowing into the mixing chamber are there immediately mixed with the hot gas. From the mixing chamber, the particles are carried with the hot gas up into the preseparation chamber 230 and a portion of the particles further into the riser 214.

The fluidized bed may also be divided into several, separate beds, i.e. partial beds, so that it is possible to operate at different temperatures in different partial beds. Thus, one partial bed may have e.g. superheating surface and a high bed temperature, e.g., 600° C., and another, e.g. vaporizing surface and a lower bed temperature, e.g., 350° C.

The riser 214 is preferably provided so that its free flow cross section is smaller than that of the preseparation chamber 230. This may be provided simply so that the cross section of the flow duct is made smaller than that of the preseparation chamber or alternatively so that the riser 214 is provided with heat transfer surfaces 232, which consume space in the duct, so that the real flow cross section becomes smaller.

The riser 14, 214 may also be constructed as a fire tube type, in which the suspension of gas and particles flows in substantially vertical ducts or tubes, encircled by a heat transfer medium such as air.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of cooling hot gas in a reactor having lower and upper sections, and having an inlet duct, a fluidized bed, and a mixing chamber in the lower section of the reactor, the mixing chamber having wall surfaces and disposed above the inlet duct, a riser from the mixing chamber, a gas outlet in the upper section of the reactor, and a particle separator in communication with the upper section of the reactor, said method comprising the steps of:

(a) introducing hot gas at a first temperature into the mixing chamber through the inlet duct, the gas flowing upwardly through the mixing chamber where it comes into contact with and entrains cooling particles, and then flows into the riser;

(b) separating particles from gas in the separator, returning the separated particles toward the fluidized bed, and discharging the hot gases from the separator;

(c) introducing some returning particles from step (b) directly into the mixing chamber and others into the fluidized bed;

(d) cooling the particles in, or prior to return to, or both in and prior to return to, the fluidized bed; and (e) introducing some cooled particles from the fluidized bed into the mixing chamber so that the cooled particles flow along the wall surfaces of the mixing chamber so as to contact and mix with the hot gas introduced in step (a) and effect cooling thereof, lowering the temperature of the hot gas so that when it is discharged from the separator in step (b) it is at a second temperature lower than the first temperature.

2. A method as recited in claim 1 comprising the further step of cooling the particles during the practice of step (b) as the particles are being returned so that the particles introduced by step (c) directly into the mixing chamber have been cooled.

3. A method as recited in claim 2 comprising the further step of cooling the hot gas and particles in the mixing chamber by bringing them into random contact with the wall surfaces, and cooling the wall surfaces.

4. A method as recited in claim 3 wherein said cooling steps are practiced to cool the hot gas to a second temperature which is below the temperature at which components in the hot gas are sticky and impede gas flow.

5. A method as recited in claim 1 wherein the separation of step (b) is practiced within the upper section of the reactor and in a plurality of distinct particle separators, and wherein the fluidized bed is within the reactor and generally concentric with the mixing chamber and inlet duct.

6. A method as recited in claim 1 comprising the further step (f) of cooling the gas, and particles entrained therein, in the riser.

7. A method as recited in claim 6 wherein step (f) is practiced by providing heat recovery surfaces in the riser into which the gas and entrained particles come into random contact with.

8. A method as recited in claim 1 comprising the further step of cooling the gases and particles in the mixing chamber by bringing them into random contact with the wall surfaces, and cooling the wall surfaces.

9. Apparatus for cooling hot gases, comprising:

a reactor having a lower section and an upper section;

a gas outlet in the upper section;

a gas inlet duct located in the lower section of the reactor for introduction of hot gases at a first temperature;

a mixing chamber, in which hot gas and cooling particles are mixed, in the lower section of the reactor above the inlet duct;

a riser connecting the mixing chamber and the upper section of the reactor;

a particle separator in operative communication with the upper section of the reactor for separating particles from gas and for discharging cooled hot gases;

a return duct for returning particles from the particle separator toward the lower section of the reactor;

a fluidized bed of particles connected to the return duct;

means for introducing particles from the return duct directly into the mixing chamber, and into the fluidized bed;

means for cooling separated particles in, or prior to return to, or both in and prior to return to, the fluidized bed; and means for introducing some cooled particles from the fluidized bed into the mixing chamber so as to contact and mix with the hot gas introduced into the inlet duct and effect cooling thereof, lowering the temperature of the hot gas discharged from the separator to a second temperature lower than the first temperature.

10. Apparatus as recited in claim 9 wherein said introducing means for introducing particles from said fluidized bed into said mixing chamber comprises a loop seal, J seal, gill seal, valve, baffle assembly, conduit, or diverter.

11. Apparatus as recited in claim 9 wherein the means for introducing particles from the return duct directly into the mixing chamber and into the fluidized bed comprises a baffle assembly, differently directed conduits, or diverter.

12. Apparatus as recited in claim 9 wherein said mixing chamber is generally vertical having a top and a bottom, and has a truncated cone or prism configuration; and wherein said mixing chamber has a larger cross-sectional area adjacent the top thereof than the bottom thereof.

13. Apparatus as recited in claim 9 wherein said cooling means comprises cooling elements disposed in said fluidized bed.

14. Apparatus as recited in claim 13 wherein said cooling means further comprise heat transfer surfaces disposed in said return duct prior to said means for introducing particles from the return duct directly into the mixing chamber and into the fluidized bed.

15. Apparatus as recited in claim 13 wherein said cooling means further comprises cooling wall panels defining said mixing chamber.

16. Apparatus as recited in claim 13 wherein said cooling means further comprises cooling surfaces disposed in said riser.

17. Apparatus as recited in claim 9 wherein said fluidized bed comprises an annular chamber surrounding said mixing chamber.

18. Apparatus as recited in claim 9 wherein said particle separator comprises a plurality of particle separators disposed within said reactor upper section, and wherein said fluidized bed is within said reactor lower section.

19. Apparatus as recited in claim 9 wherein said particle separator comprises a single particle separator located externally of said reactor and wherein said return duct and said means for introducing particles from the return duct directly into the mixing chamber and into the fluidized bed are external of said reactor.

20. Apparatus for cooling hot gases, comprising:

a reactor having a lower section and an upper section;

a gas outlet in the upper section;

a gas inlet duct located in the lower section of the reactor through which hot gases at a first temperature are introduced;

a mixing chamber, in which hot gas and cooling particles are mixed, in the lower section of the reactor above the inlet duct;

a riser connecting the mixing chamber and the upper section of the reactor;

a particle separator in operative communication with the upper section of the reactor for separating particles from gas and for discharging cooled hot gas;

a fluidized bed of particles;

a return duct for returning particles from the particle separator to said fluidized bed of particles;

means for cooling separated particles in, or prior to return to, or both in and prior to return to, the fluidized bed; and means for introducing some cooled particles from the fluidized bed into the mixing chamber at a level below said cooling means so that the introduced particles have been cooled by said cooling means and so as to contact and mix with the hot gas introduced into the inlet duct and effect cooling thereof lowering the temperature of the hot gas discharged from the separator to a second temperature lower than the first temperature.

21. Apparatus as recited in claim 20 wherein said introducing means for introducing particles from said fluidized bed into said mixing chamber comprises a loop seal, valve, baffle assembly, conduit, or diverter.

22. Apparatus as recited in claim 20 wherein said mixing chamber is generally vertical having a top and a bottom, and has a truncated cone or prism configuration; and wherein said mixing chamber has a larger cross-sectional area adjacent the top thereof than the bottom thereof.

23. Apparatus as recited in claim 20 wherein said cooling means comprises cooling elements disposed in said fluidized bed, and disposed in or defining at least one of said return duct and mixing chamber.

24. Apparatus as recited in claim 20 wherein said particle separator comprises a plurality of particle separators disposed within said reactor upper section, and wherein said fluidized bed is within said reactor lower section.

25. Apparatus as recited in claim 20 wherein said particle separator comprises a single particle separator located externally of said reactor and wherein said return duct and said means for introducing particles from the return duct directly into the mixing chamber and into the fluidized bed are external of said reactor.

26. Apparatus for cooling hot gases as recited in claim 9 wherein the fluidized bed has a top and a bottom, said bottom adjacent said gas inlet duct; and wherein said means for introducing some cooled particles from the fluidized bed into the mixing chamber comprises an outlet from the fluidized bed adjacent said bottom of the fluidized bed and below said cooling means so that the introduced particles have been positively cooled by said cooling means.

27. A method as recited in claim 1 wherein step (e) is practiced by providing a pressure difference between the mixing chamber and the fluidized bed causing the flow of cooled particles from the mixing chamber to the fluidized bed.

28. A method as recited in claim 1 wherein step (d) is practiced by cooling means at a given vertical level; and wherein step (e) is practiced to introduce particles from the fluidized bed into the mixing chamber at a bottom portion of the fluidized bed, below the level of the cooling means, so that the particles so introduced have been positively cooled by the cooling means.

29. A method as recited in claim 28 wherein step (a) is practiced by introducing gas at a first temperature of over about 400 degrees C, and wherein cooling is practiced to cool the hot gas to a second temperature which is below the temperature at which components in the hot gas are sticky and impede gas flow.

* * * * *